(12) United States Patent
Akiyama et al.

(10) Patent No.: US 9,983,470 B2
(45) Date of Patent: May 29, 2018

(54) LIGHT SOURCE DEVICE AND PROJECTOR

(71) Applicant: SEIKO EPSON CORPORATION, Tokyo (JP)

(72) Inventors: Koichi Akiyama, Matsumoto (JP); Akira Egawa, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days. days.

(21) Appl. No.: 15/373,194

(22) Filed: Dec. 8, 2016

(65) Prior Publication Data

US 2017/0168381 A1 Jun. 15, 2017

(30) Foreign Application Priority Data

Dec. 14, 2015 (JP) ................. 2015-243273

(51) Int. Cl.
| | |
|---|---|
| G03B 21/20 | (2006.01) |
| H04N 9/31 | (2006.01) |
| G02B 27/09 | (2006.01) |
| G02B 27/30 | (2006.01) |
| G03B 21/00 | (2006.01) |

(Continued)

(52) U.S. Cl.
CPC ..... *G03B 21/2073* (2013.01); *G02B 19/0047* (2013.01); *G02B 19/0052* (2013.01); *G02B 27/0961* (2013.01); *G02B 27/0966* (2013.01); *G02B 27/14* (2013.01); *G02B 27/283* (2013.01); *G02B 27/30* (2013.01); *G03B 21/005* (2013.01); *G03B 21/204* (2013.01);

(Continued)

(58) Field of Classification Search
CPC .............. G03B 21/204; G03B 21/2013; G03B 21/208; G03B 21/2073; H04N 9/315; H04N 9/3152; H04N 9/3158; H04N 9/3161; H04N 9/3164; H04N 9/3167
See application file for complete search history.

(56) References Cited

U.S. PATENT DOCUMENTS 5,812,242 A * 9/1998 Tokuda ............... G03F 7/70891
355/30
6,464,362 B1 10/2002 Sugawara et al.
(Continued)

FOREIGN PATENT DOCUMENTS

| JP | 2000-137204 A | 5/2000 |
|---|---|---|
| JP | 2007-163726 A | 6/2007 |

(Continued)

*Primary Examiner* — Ryan Howard
(74) *Attorney, Agent, or Firm* — Oliff PLC (57) ABSTRACT

The invention relates to a light source device including a solid-state light source, a collimator lens which a light beam emitted from the solid-state light source enters, an afocal optical system which includes a light collecting optical system and a collimating optical system and which the light beam having been transmitted through the collimator lens enters, a lens integrator which the light beam having been transmitted through the afocal optical system enters, a polarization splitting element which the light beam having been transmitted through the lens integrator enters, and a wavelength conversion element which a first polarization component split by the polarization splitting element from the light beam enters. At least one of the light collection optical system and the collimating optical system includes a lens formed of quartz.

12 Claims, 6 Drawing Sheets

(51) Int. Cl.
    *G02B 27/14*    (2006.01)
    *G02B 27/28*    (2006.01)
    *G02B 19/00*    (2006.01)

(52) U.S. Cl.
    CPC ........ *G03B 21/208* (2013.01); *G02B 19/0009* (2013.01); *H04N 9/3158* (2013.01)

(56) References Cited

U.S. PATENT DOCUMENTS

| | | |
|---|---|---|
| 2007/0132954 A1 | 6/2007 | Yanai et al. |
| 2012/0127435 A1 | 5/2012 | Kitano et al. |
| 2012/0140183 A1 | 6/2012 | Tanaka et al. |
| 2013/0088471 A1 | 4/2013 | Kitano |
| 2014/0268063 A1* | 9/2014 | Akiyama ............. G03B 21/204 353/20 |

FOREIGN PATENT DOCUMENTS

| | | |
|---|---|---|
| JP | 2012-103615 A | 5/2012 |
| JP | 2012-108486 A | 6/2012 |
| JP | 2012-137744 A | 7/2012 |
| JP | 2013-073081 A | 4/2013 |
| JP | 2013-092752 A | 5/2013 |
| JP | 2015-031925 A | 2/2015 |
| JP | 2016-170390 A | 9/2016 |

* cited by examiner

LIGHT SOURCE DEVICE AND PROJECTOR

BACKGROUND

1. Technical Field

The present invention relates to a light source device and a projector.

2. Related Art

There have been known a light source device, which excites a phosphor with light emitted from a plurality of semiconductor lasers, and uses the fluorescence emitted from the phosphor thus excited, and a projector using the light source device (see, e.g., JP-A-2012-137744).

In the light source device, the light emitted from a solid-state light source unit is split by a polarization splitting mirror, one light thus split is guided to a phosphor layer as excitation light, and the other light thus split and the light obtained from the phosphor layer are combined with each other to obtain illumination light. Further, by adjusting the polarization state of the light entering the polarization splitting mirror using a wave plate disposed on the light path between the solid-state light source unit and the polarization splitting mirror, the desired light with the color balance adjusted is generated.

Incidentally, in the light source device described above, the excitation light emitted from the solid-state light source unit enters an optical element disposed in an anterior stage of the polarization splitting mirror, and thus, the optical element is heated and is expanded. Then, birefringence occurs in the optical element due to the photoelastic effect, and the polarization state of the excitation light is disturbed. Therefore, there is a possibility that it is unachievable to split the light emitted from the solid-state light source unit using the polarization splitting mirror at a predetermined proportion, and the desired light cannot be generated.

SUMMARY

An advantage of some aspects of the invention is to provide a light source device and a projector each capable of emitting the desired light.

According to a first aspect of the invention, there is provided a light source device including a solid-state light source, a collimator lens which a light beam emitted from the solid-state light source enters, an afocal optical system which includes a light collecting optical system and a collimating optical system and which the light beam having been transmitted through the collimator lens enters, a lens integrator which the light beam having been transmitted through the afocal optical system enters, a polarization splitting element which the light beam having been transmitted through the lens integrator enters, and a wavelength conversion element which a first polarization component split by the polarization splitting element from the light beam enters, wherein at least one of the light collection optical system and the collimating optical system includes a lens formed of quartz.

According to the light source device related to the first aspect of the invention, since the afocal optical system includes the lens formed of quartz low in internal absorption and thermal expansion coefficient, it is possible to reduce the change in birefringence due to the photoelastic effect caused by the afocal optical system absorbing the light. Therefore, since it is possible to reduce the change in polarization state of the light transmitted through the afocal optical system, it is possible to split the predetermined amount of first polarization component using the polarization splitting element. Therefore, the desired light is easily obtained.

In the first aspect of the invention described above, it is preferable that the light collection optical system is constituted by an aspherical lens formed of a glass material higher in thermal expansion coefficient than the quartz, and the collimating optical system is constituted by a biconcave lens formed of the quartz.

According to this configuration, since the lens formed of quartz is used for the collimating optical system, through which the light collected and high in light density is transmitted, and which is large in heat generation amount, it is possible to efficiently reduce the change in birefringence due to the photoelastic effect caused in the afocal optical system.

Since the quartz is low in refractive index, it is hard for the lens formed of quartz (quartz lens) to largely refract the light. However, in the collimating optical system, since a biconcave lens capable of refracting the light on the both surfaces of the lens is adopted as the quartz lens, it is possible to preferably refract the light to thereby collimate the light. Further, by using the light collection optical system formed of the aspherical lens, it is possible to make it difficult to cause aberration in the light beam transmitted through the afocal optical system.

In the first aspect of the invention described above, it is preferable that the light collection optical system is constituted by two spherical lenses formed of the quartz, and the collimating optical system is constituted by a biconcave lens formed of the quartz.

According to this configuration, since the lens formed of quartz is used for the collimating optical system, through which the light collected and high in light density is transmitted, and which is large in heat generation amount, it is possible to reduce the change in birefringence due to the photoelastic effect caused in the collimating optical system.

Further, by using the two spherical lenses as the light collection optical system, it is possible to make it difficult to cause the aberration in the light beam transmitted through the afocal optical system while reducing the cost compared to the case of using a single aspherical lens.

Since the quartz is relatively low in refractive index, it is difficult for the quartz lens to largely refract the light. However, it is possible for the biconcave lens to preferably collimate the light by refracting the light using both of the surfaces of the lens.

In the first aspect of the invention described above, it is preferable that the lens integrator includes a first lens array, and a second lens array disposed in a posterior stage of the first lens array and formed of the quartz.

According to this configuration, since the second lens array, through which the light collected and high in light density is transmitted, and which is large in heat generation amount, is formed of quartz, it is possible to reduce the change in birefringence due to the photoelastic effect caused in the lens integrator.

In the first aspect of the invention described above, it is preferable that the collimator lens is formed of the quartz.

According to this configuration, the change in birefringence due to the photoelastic effect caused in the collimator lens can be reduced.

In the first aspect of the invention described above, it is preferable that there is further included a reduction optical system adapted to reduce a cross section of a bundle of light beams formed of a plurality of the light beams having been emitted from a plurality of the solid-state light source, and having been transmitted through a plurality of the collimator lenses, and the reduction optical system includes an optical element formed of the quartz.

According to this configuration, the change in birefringence due to the photoelastic effect caused in the optical element of the reduction optical system can be reduced.

In the first aspect of the invention described above, it is preferable that the quartz is synthetic quartz.

According to this configuration, since the synthetic quartz high in purity is used, the thermal expansion coefficient and the internal absorptance can be made lower. Therefore, the change in birefringence due to the photoelastic effect in the afocal optical system can further be reduced.

According to a second aspect of the invention, there is provided a projector including the light source device according to the first aspect of the invention, a light modulation device adapted to modulate light from the light source device in accordance with image information to thereby form image light, and a projection optical system adapted to project the image light.

The projector related to the second aspect of the invention is provided with the light source device according to the first aspect of the invention described above, and can therefore project the image light with the desired color balance.

BRIEF DESCRIPTION OF THE DRAWINGS

The invention will be described with reference to the accompanying drawings, wherein like numbers reference like elements.

DESCRIPTION OF EXEMPLARY
EMBODIMENTS

Some embodiments of the invention will hereinafter be described in detail with reference to the accompanying drawings.

It should be noted that the drawings used in the following description show characteristic parts in an enlarged manner in some cases in order to make the characteristics easy to understand, and the dimensional ratios between the constituents and so on are not necessarily the same as actual ones.

First Embodiment

Firstly, an example of a projector according to the present embodiment will be explained.

Figure 1:
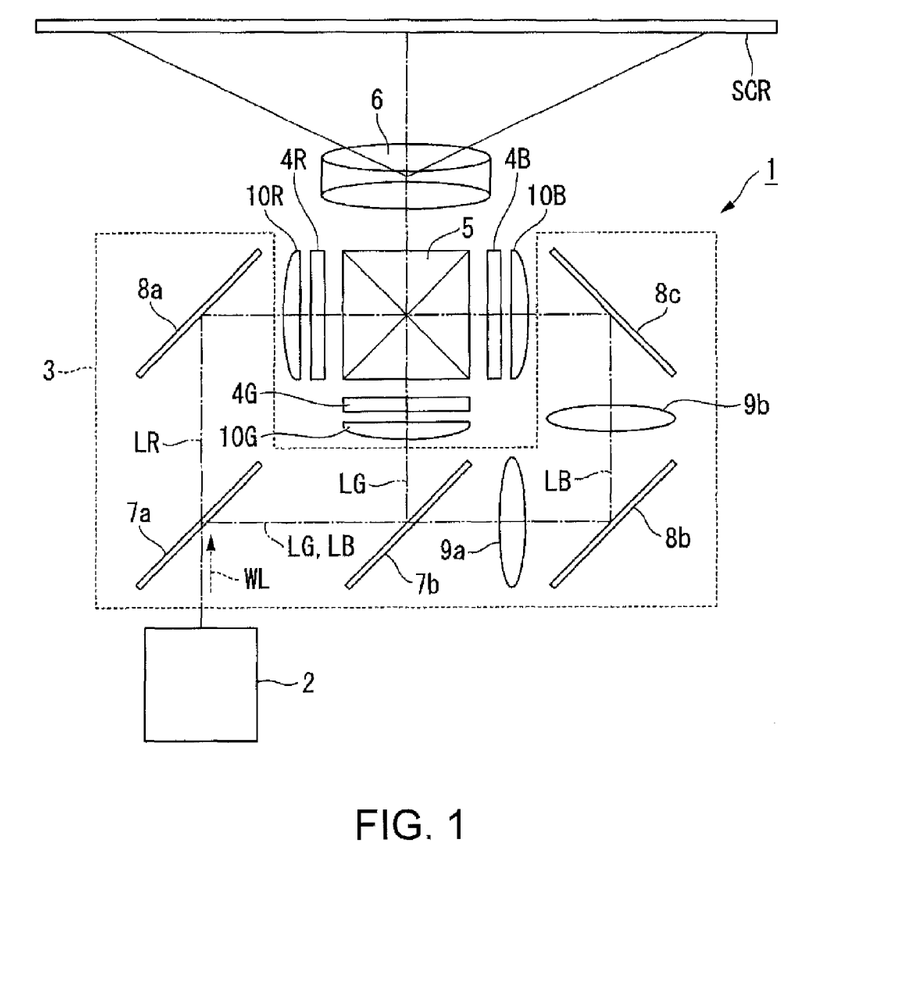
FIG. 1 is a diagram showing a schematic configuration of a projector according to a first embodiment of the invention.

FIG. 1 is a diagram showing a schematic configuration of the projector according to the present embodiment.

As shown in FIG. 1, the projector 1 according to the present embodiment is a projection-type image display device for displaying a color picture on a screen SCR. The projector 1 is provided with an illumination device 2, a color separation optical system 3, a light modulation device 4R, a light modulation device 4G, a light modulation device 4B, a combining optical system 5, and a projection optical system 6.

The color separation optical system 3 separates white light WL into red light LR, green light LG, and blue light LB. The color separation optical system 3 is generally provided with a first dichroic mirror 7a and a second dichroic mirror 7b, a first total reflection mirror 8a, a second total reflection mirror 8b, and a third total reflection mirror 8c, and a first relay lens 9a and a second relay lens 9b.

The first dichroic mirror 7a separates the illumination light WL from the illumination device 2 into the red light LR and the other light (the green light LG and the blue light LB). The first dichroic mirror 7a transmits the red light LR thus separated from, and at the same time reflects the other light (the green light LG and the blue light LB). In contrast, the second dichroic mirror 7b reflects the green light LG and at the same time transmits the blue light LB to thereby separate the other light into the green light LG and the blue light LB.

The first total reflection mirror 8a is disposed in the light path of the red light LR, and reflects the red light LR, which has been transmitted through the first dichroic mirror 7a, toward the light modulation device 4R. Meanwhile, the second total reflection mirror 8b and the third total reflection mirror 8c are disposed in the light path of the blue light LB to guide the blue light LB, which has been transmitted through the second dichroic mirror 7b, to the light modulation device 4B. The green light LG is reflected by the second dichroic mirror 7b toward the light modulation device 4G.

The first relay lens 9a and the second relay lens 9b are disposed on the light emission side of the second dichroic mirror 7b in the light path of the blue light LB. The first relay lens 9a and the second relay lens 9b have a function of compensating the optical loss of the blue light LB due to the fact that the optical path length of the blue light LB is longer than the optical path lengths of the red light LR and the green light LG.

The light modulation device 4R modulates the red light LR in accordance with image information to form image light corresponding to the red light LR. The light modulation device 4G modulates the green light LG in accordance with the image information to form image light corresponding to the green light LG. The light modulation device 4B modulates the blue light LB in accordance with the image information to form image light corresponding to the blue light LB.

As the light modulation device 4R, the light modulation device 4G, and the light modulation device 4B, there are used, for example, transmissive liquid crystal panels. Further, in the incident side and the exit side of each of the liquid crystal panels, there are respectively disposed polarization plates (not shown).

Further, on the incident side of the light modulation device 4R, the light modulation device 4G, and the light modulation device 4B, there are disposed a field lens 10R, a field lens 10G, and a field lens 10B, respectively. The field lenses 10R, 10G, and 10B collimate the red light LR, the green light LG, and the blue light LB entering the light modulation devices 4R, 4G, and 4B, respectively.

The image light from the light modulation devices 4R, 4G, and 4B enters the combining optical system 5. The combining optical system 5 combines the image light corresponding to the red light LR, the image light corresponding to the green light LG, and the image light corresponding to the blue light LB with each other, and then emits the image light thus combined toward the projection optical system 6. As the combining optical system 5, there is used, for example, a cross dichroic prism.

The projection optical system 6 is formed of a projection lens group, and projects the image light combined by the combining optical system 5 toward the screen SCR in an enlarged manner. Thus, a color picture thus enlarged is displayed on the screen SCR.

Illumination Device

Figure 2:
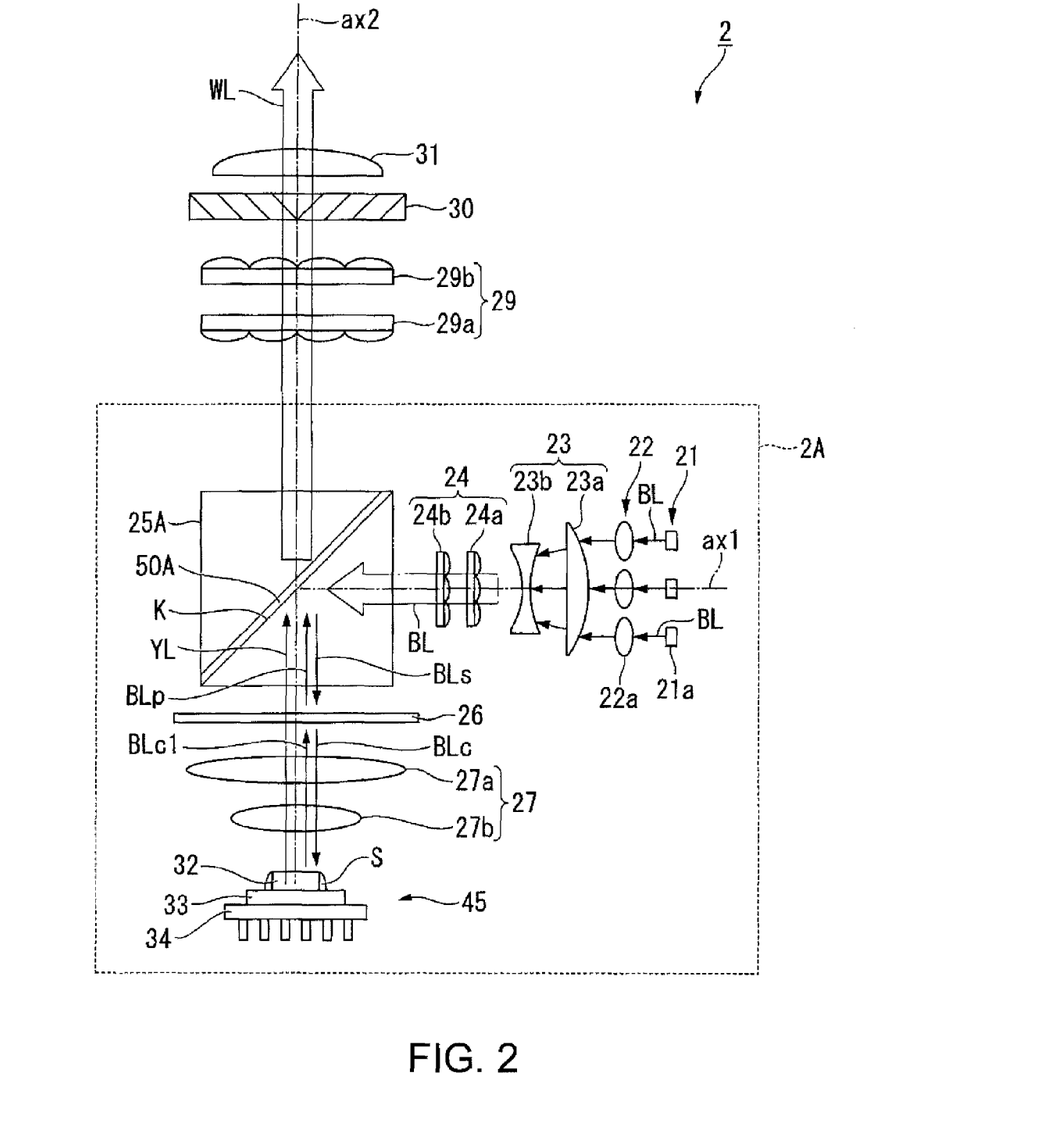
FIG. 2 is a diagram showing a schematic configuration of an illumination device.

Subsequently, a configuration of the illumination device 2 will be described. FIG. 2 is a diagram showing a schematic configuration of the illumination device 2. As shown in FIG. 2, the illumination device 2 is provided with a light source device 2A, an integrator optical system 29, a polarization conversion element 30, and an overlapping optical system 31.

The light source device 2A is provided with an array light source 21, a collimator optical system 22, an afocal optical system. 23, a homogenizer optical system. 24, an optical element 25A including a polarization splitting element 50A, a wave plate 26, a pickup optical system. 27, and a fluorescence emitting element 45.

The array light source 21, the collimator optical system 22, the afocal optical system 23, the homogenizer optical system 24, and the optical element 25A are disposed on an optical axis ax1. Meanwhile, the fluorescence emitting element 45, the pickup optical system 27, the wave plate 26, the optical element 25A, the integrator optical system. 29, the polarization conversion element 30, and the overlapping optical system 31 are disposed on an optical axis ax2. The optical axis ax1 and the optical axis ax2 are located in the same plane, and are perpendicular to each other.

The array light source 21 has a configuration having a plurality of semiconductor lasers 21a arranged. Specifically, the plurality of semiconductor lasers 21a is arranged in an array in a plane perpendicular to the optical axis ax1. As first light in a first wavelength band, the semiconductor lasers 21a each emit a blue light beam BL having a peak wavelength in a wavelength band of, for example, 440 through 480 nm as the excitation light. The light beams BL emitted from the respective semiconductor lasers 21a are emitted in parallel to the optical axis ax1 toward the polarization splitting element 50A.

The semiconductor lasers 21a of the present embodiment correspond to a "solid-state light source" in the appended claims.

In the array light source 21, all of the semiconductor lasers 21a are arranged so that the light beams BL emitted from the semiconductor lasers 21a enter the polarization splitting element 50A as S-polarized light. The light beams BL emitted from the array light source 21 enter the collimator optical system 22.

The collimator optical system 22 converts the light beams BL emitted from the array light source 21 into parallel light. The collimator optical system 22 is formed of a plurality of collimator lenses 22a arranged in an array so as to correspond to the arrangement of, for example, the plurality of semiconductor lasers 21a. The light beams BL having been transmitted through the collimator optical system 22 to thereby be converted into the parallel light enter the afocal optical system 23.

The afocal optical system 23 reduces the diameter of the bundle of the light beams formed of the plurality of light beams BL. The afocal optical system 23 is formed of, for example, two afocal lenses 23a, 23b.

In the present embodiment, the afocal lens 23a is an aspherical lens having a light receiving surface formed of an aspheric surface. The afocal lens 23a has a function of converging the plurality of light beams BL from the collimator optical system 22 so as to approach the optical axis ax1.

The afocal lens 23a is formed of a general glass material, and is higher in thermal expansion coefficient than quartz.

In the present embodiment, the afocal lens 23b is formed of a biconcave lens, both a light receiving surface and a light outputting surface are each formed of a concave surface. The afocal lens 23b has a function of converting the plurality of light beams BL having been converged by the afocal lens 23a into parallel light parallel to the optical axis ax1.

The afocal lens 23b is a lens (a quartz lens) formed of quartz. Therefore, the thermal expansion coefficient of the afocal lens 23b is lower than that of the general glass material.

In the present embodiment, the afocal lens 23a corresponds to a "light collection optical system" in the appended claims, and the afocal lens 23b corresponds to a "collimating optical system" in the appended claims.

Based on the configuration described above, the afocal optical system 23 reduces the diameter of the bundle of the light beams formed of the plurality of light beams BL, and then makes the bundle of the light beams enter the homogenizer optical system 24.

The homogenizer optical system 24 homogenizes the illuminance distribution in an illumination target area (here the phosphor layer 32). The homogenizer optical system 24 is formed of, for example, a pair of multi-lens arrays 24a, 24b. The lenses of the multi-lens array 24a divide the light from the afocal optical system 23 into a plurality of small light beams, and then make the small light beams enter the corresponding lenses of the multi-lens array 24b.

The light beams BL having passed through the homogenizer optical system 24 enter the fluorescence emitting element 45 via the polarization splitting element 50A. In the present embodiment, the homogenizer optical system 24 corresponds to a "lens integrator" in the appended claims.

The optical element 25A is formed of, for example, a dichroic prism having wavelength selectivity. The dichroic prism has a tilted surface K having an angle of 45° with the optical axis ax1 and the optical axis ax2. The tilted surface K is disposed at the intersection between the optical axes ax1, ax2 perpendicular to each other. The tilted surface K is provided with the polarization splitting element 50A having wavelength selectivity.

The polarization splitting element 50A has a polarization splitting function with respect to the light beams BL in the first wavelength band. In the present embodiment, the polarization splitting element 50A reflects the S-polarization component of the light beams BL and transmits the P-polarization component of the light beams BL. Further, the polarization splitting element 50A has a color separation function of transmitting the light in a second wavelength band different from the first wavelength band (the wavelength band of the light beams BL) irrespective of the polarization state.

In the case of the present embodiment, the light beams BL emitted from the semiconductor laser 21a enter the polarization splitting element 50A as the S-polarized light. Therefore, the light beams BL having entered the polarization splitting element 50A are reflected toward the fluorescence emitting element 45 as the light beam BLs in the S-polarized state.

It should be noted that the optical element 25A is not limited to an element having a prismatic shape, but a dichroic mirror having a plate shape can also be used. The light beam BLs in the present embodiment corresponds to a "first polarization component" in the appended claims.

The wave plate 26 is disposed in the light path between the polarization splitting element 50A and the phosphor layer 32 of the fluorescence emitting element 45. The wave plate 26 is formed of a ¼ wave plate (λ/4 plate). The light beam BLs as the S-polarized light is transmitted through the wave plate 26 to thereby be converted into the light beam BLc as circularly polarized light. Subsequently, the light beam BLc as the circularly polarized light enters the pickup optical system 27. As described later, the wave plate 26 is provided with a rotary mechanism (not shown). Thus, the optical axis of the wave plate 26 can be rotated around the optical axis ax2.

The pickup optical system 27 concentrates the light beam BLc toward the phosphor layer 32. The pickup optical system 27 is formed of, for example, pickup lenses 27a, 27b.

Figure 3:
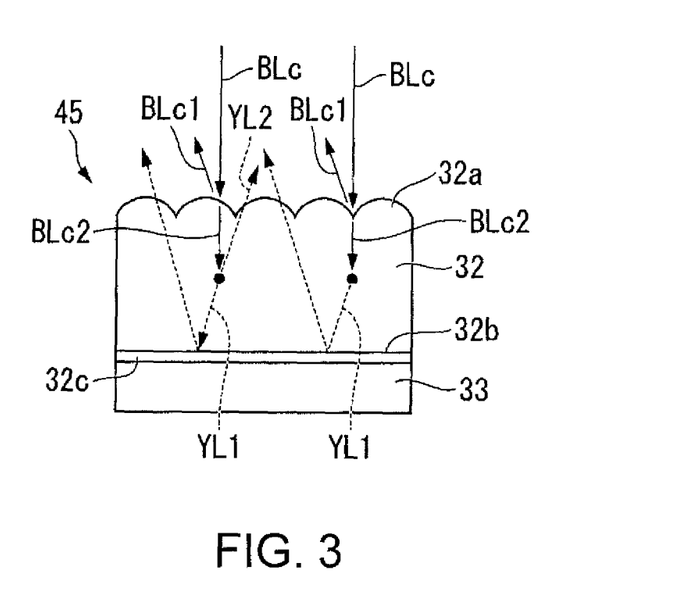
FIG. 3 is a diagram showing a configuration of an essential part of a fluorescence emitting element.

FIG. 3 is a diagram showing a configuration of a principal part of the fluorescence emitting element 45.

As shown in FIG. 3, in the light path between the wave plate 26 and the phosphor layer 32, there is disposed a reflecting part 32a. The reflecting part 32a reflects a partial light beam BLc1 of the light beam BLc, which is the first light in the first wavelength band, toward the polarization splitting element 50A. The reflecting part 32a transmits another partial light beam BLc2 of the light beam BLc toward the phosphor layer 32. The reflecting part 32a transmits fluorescence YL2, which is the second light in the second wavelength band.

The fluorescence emitting element 45 is provided with the phosphor layer 32, the reflecting part 32a, a reflecting element 32b, and a substrate 33 for supporting the phosphor layer 32. The light beam BLc enters the phosphor layer 32 from an opposite side to the substrate 33. The phosphor layer 32 includes a phosphor, which absorbs the light beam BLc2 as the first light in the first wavelength band to thereby be excited. The phosphor having been excited by the light beam BLc2 generates yellow fluorescence having the peak wavelength in a wavelength band of, for example, 500 through 700 nm as the second light in the second wavelength band different from the first wavelength band.

In the present embodiment, the reflecting part 32a is formed of a diffusely reflecting surface provided to the surface of the phosphor layer 32 to which the light beam BLc is input. The diffusely reflecting surface diffusely reflecting the partial light beam BLc1 of the light beam BLc toward the polarization splitting element 50A.

The diffusely reflecting surface can be formed by, for example, performing a dimple formation process on the surface of the phosphor layer 32 to which the light beam BLc is input. In this case, it is possible for the reflecting part 32a to diffusely reflect the partial light beam BLc1 out of the light beam BLc toward the polarization splitting element 50A using the Fresnel reflection by the surface provided with a number of convex surfaces.

In the present embodiment, the reflecting element 32b is disposed on an opposite side of the phosphor layer 32 to the side to which the light beam BLc is input. The reflecting element 32b is formed of a specularly reflecting surface. The specularly reflecting surface reflects the fluorescence YL1 generated in the phosphor layer 32. Specifically, the specularly reflecting surface can be configured by disposing a reflecting film 32c on a surface of the phosphor layer 32 on the opposite side to the side to which the light beam BLc is input.

Further, in the case in which the substrate 33 is formed of a material having light reflectivity, the specularly reflecting surface can be formed by specular-finishing the surface of the substrate 33 opposed to the phosphor layer 32 with the reflecting film 32c omitted.

It should be noted that the reflecting element 32b also functions as a reflecting part for reflecting the component, which has failed to be converted into the fluorescence out of the excitation light (the light beam BLc2) having entered the fluorescence emitting element 45, toward the polarization splitting element 50A.

As shown in FIG. 2, the phosphor layer 32 is fixed to the substrate 33 with an inorganic adhesive S having light reflectivity disposed on the side surface of the phosphor layer 32. On a surface of the substrate 33 on the opposite side to the surface for supporting the phosphor layer 32, there is disposed a heatsink 34.

A partial fluorescence YL1 proceeding toward the substrate 33 out of the fluorescence generated in the phosphor layer 32 is reflected by the reflecting element 32b, and is then emitted to the outside of the phosphor layer 32. Further, another partial fluorescence YL2 proceeding toward the opposite side to the substrate 33 out of the fluorescence generated in the phosphor layer 32 is emitted to the outside of the phosphor layer 32 without being reflected by the reflecting element 32b. In such a manner, the yellow fluorescence YL is emitted from the phosphor layer 32 toward the polarization splitting element 50A.

The yellow fluorescence YL having been emitted from the phosphor layer 32 toward the polarization splitting element 50A is transmitted through the pickup optical system 27 and the wave plate 26. Since the fluorescence YL is unpolarized light, the fluorescence YL enters the polarization splitting element 50A as the unpolarized light even after passing through the wave plate 26. The fluorescence YL is transmitted through the polarization splitting element 50A.

Meanwhile, the blue light beam BLc1 having been reflected by the reflecting part 32a is transmitted again through the pickup optical system 27 and the wave plate 26. The light beam BLc1 is transmitted again through the wave plate 26 to thereby be converted from the circularly polarized light into light beam BLp as the P-polarized light. The light beam BLp as the P-polarized light is transmitted through the polarization splitting element 50A.

The blue light beam BLp transmitted through the polarization splitting element 50A and the yellow fluorescence YL are combined with each other, and thus, the white illumination light WL is obtained. The illumination light WL is transmitted through the polarization splitting device 50A, and then enters the integrator optical system 29. It should be noted that in order to obtain the white light (the illumination light) WL high in color temperature, the reflectance of the reflecting part 32a to the light beam BLc is preferably set to 10 through 25%, and is more preferably set to 15 through 20%.

The integrator optical system 29 homogenizes the illuminance distribution in the liquid crystal panel as the illumination target area. The integrator optical system 29 is formed of lens arrays 29a, 29b. The lens array 29a and the lens array 29b are each have a configuration having a plurality of lenses arranged in an array. The illumination light WL having been transmitted through the integrator optical system 29 enters the polarization conversion element 30.

The polarization conversion element 30 converts the illumination light WL into linearly polarized light. The illumination light WL having passed through the polarization conversion element 30 enters the overlapping optical system 31.

The overlapping optical system 31 is formed of an overlapping lens. The illumination light WL is transmitted through the overlapping optical system 31 to thereby be overlapped on the light receiving surface of each of the light modulation devices 4R, 4G, and 4B as the illumination target area, and is homogenized in the illuminance distribution.

Incidentally, in the above description, an ideal case is described. Specifically, there is described the case in which all of the light beams BL having been emitted from the array light source 21 are reflected by the polarization splitting element 50A toward the fluorescence emitting element 45. However, as described later, there is a case in which some of the light beams BL fails to be reflected by the polarization splitting element 50A.

In the present embodiment, on the optical axis ax1 between the array light source 21 and the polarization splitting element 50A, there are disposed the collimator optical system 22, the afocal optical system 23, and the homogenizer optical system 24. The internal absorptance of the glass material constituting these optical systems is not zero. Therefore, the glass material constituting these optical systems partially absorbs the light beams BL emitted from the array light source 21 to be heated.

In the case in which the glass material has a positive thermal expansion coefficient, if the glass material is heated, the glass material expands. Even if the optical system does not have birefringence at room temperature, a thermal strain occurs due to the expansion, and as a result, birefringence occurs in the optical system. Hereinafter, this phenomenon is referred to as a photoelastic effect.

Due to the disturbance of the polarization state caused by the photoelastic effect, a P-polarization component becomes to be included in the light beams BL, which has been formed only of the S-polarization component when emitted from the array light source 21. Then, the P-polarization component out of the light beams BL having been emitted from the array light source 21 are transmitted through the polarization splitting element 50A. Therefore, the light intensity of the light beam BLs reflected by the polarization splitting element 50A toward the fluorescence emitting element 45 is decreased. As a result, the ratio between the blue light (the light beam BLp) available as the illumination light WL and the fluorescence YL changes, and there is a possibility that the color balance (the white balance) of the illumination light WL is lost to make it unachievable to obtain the light with a desired color balance.

In the present embodiment, on the optical axis ax1 between the array light source 21 and the polarization splitting element 50A, there are disposed the collimator optical system 22, the afocal optical system 23, and the homogenizer optical system 24, and the photoelastic effect is the most apt to occur in the afocal optical system 23.

The reason that the photoelastic effect is apt to occur in the afocal optical system 23 is as follows.

Regarding the conditions in which the photoelastic effect (the birefringence) becomes apt to occur, there can be cited the fact that the thickness of the lens is thick, as the first condition. This is because the longer the light path length is, the larger the phase difference is. There can be cited the fact that the light density is high, as the second condition. This is because the higher the light density is, the more easily the temperature rises. There can be cited the fact that the lens power is high, as the third condition. This is because the difference in thickness between the center and the peripheral part of the lens is large.

The afocal lens 23a of the afocal optical system 23 fulfills the first condition described above. Further, the afocal lens 23b fulfills the second condition and the third condition described above.

As described above, since the afocal optical system 23 is formed of the lenses fulfilling the conditions in which the photoelastic effect becomes apt to occur, it can be said that, among the optical systems disposed between the array light source 21 and the polarization splitting element 50A, the afocal optical system 23 is an optical system in which the photoelastic effect is the most apt to occur.

In the present embodiment, at least one of the afocal lenses 23a, 23b constituting the afocal optical system 23 in which the photoelastic effect is the most apt to occur, specifically the afocal lens 23b, is formed of a quartz lens. The quartz lens is lower in internal absorption and thermal expansion coefficient compared to a lens made of a general glass material.

In the present embodiment, the glass material of the quartz lens is synthetic quartz. The synthetic quartz has the internal absorptance of, for example, equal to or lower than 0.1% at the wavelength of the blue light beam BL, which is 1/50 of the internal absorptance of general optical glass. Therefore, even if high-intensity light enters the quartz lens, the quartz lens is hard to be heated. Further, the synthetic quartz has the thermal expansion coefficient roughly 1/10 of the thermal expansion coefficient of general optical glass, and is hard to be distorted even if the temperature rises. Therefore, even if the intensity of the light beams BL is made high, a large thermal strain is hard to occur. In other words, the change in polarization state due to the photoelastic effect is hard to occur.

As described above, according to the afocal optical system 23 including the quartz lens, since the thermal strain due to the entrance of the light beams BL is hard to occur and generation of the birefringence is reduced, the disturbance of the polarization state of the light beams BL transmitted through the afocal optical system 23 can be reduced.

It should be noted that in order to reduce the disturbance of the polarization state of the light beams BL most, it is most preferable to form both of the afocal lenses 23a, 23b constituting the afocal optical system 23 using the quartz lens. However, forming both of the afocal lenses 23a, 23b using the quartz lenses incurs rise in cost.

In the present embodiment, out of the afocal optical system 23, the afocal lens 23b having the function as the collimating optical system for collimating the plurality of light beams BL is formed of the quartz lens, and the afocal lens 23a is formed of a general glass material.

The reason is as follows. Since the degree of light collection of the light beams BL entering the afocal lens 23a is relatively low, the light density of the light beams BL transmitted through the afocal lens 23a is low, and the amount of heat generation in the afocal lens 23a becomes small. In contrast, since the light beams BL having been collected by the afocal lens 23a enters the afocal lens 23b, the light intensity of the light transmitted through the afocal lens 23b is high, and the amount of heat generation in the afocal lens 23b becomes large.

As described above, in the afocal optical system 23 of the present embodiment, the quartz lens is used as the afocal lens 23b, which is large in amount of heat generation, and in which the birefringence is apt to occur, and the lens formed of a general glass material is used as the afocal lens 23a, in which the birefringence is relatively hard to occur. Therefore, it is possible to efficiently reduce the disturbance of the polarization state caused in the light beams BL transmitted through the afocal optical system 23 while controlling the cost.

It should be noted that since the quartz is low in refractive index, it is hard for the quartz lens (the afocal lens 23b) to largely refract the light. However, the afocal lens 23b of the present embodiment is a biconcave lens capable of refracting the light on the both surfaces of the lens, and can therefore preferably refract the light beams BL to thereby collimate the light beams BL.

Further, the afocal optical system 23 adopts the aspherical lens as the afocal lens 23a, and thus, it is possible to reduce the aberration caused on the light beams BL having been transmitted through the afocal optical system 23.

According to the light source device 2A related to the present embodiment, since the disturbance of the polarization state of the light beams BL having been transmitted through the afocal optical system 23 is reduced, it is possible for the polarization splitting element 50A to reflect the light beam BLs having predetermined light intensity toward the fluorescence emitting element 45. Therefore, the change in the ratio between the blue light (the light beam BLp) and the fluorescence YL can be reduced, and it is possible to keep the color balance (the white balance) of the illumination light WL roughly constant.

Therefore, it is possible for the illumination device 2 according to the present embodiment to emit the desired light (the light with the desired color balance). Further, according to the projector 1 related to the present embodiment, since the illumination device 2 emitting the illumination light WL with the desired color balance is provided, it is possible to project the image light superior in color balance on the screen SCR.

Second Embodiment

Subsequently, a second embodiment of the invention will be described.

Figure 4:
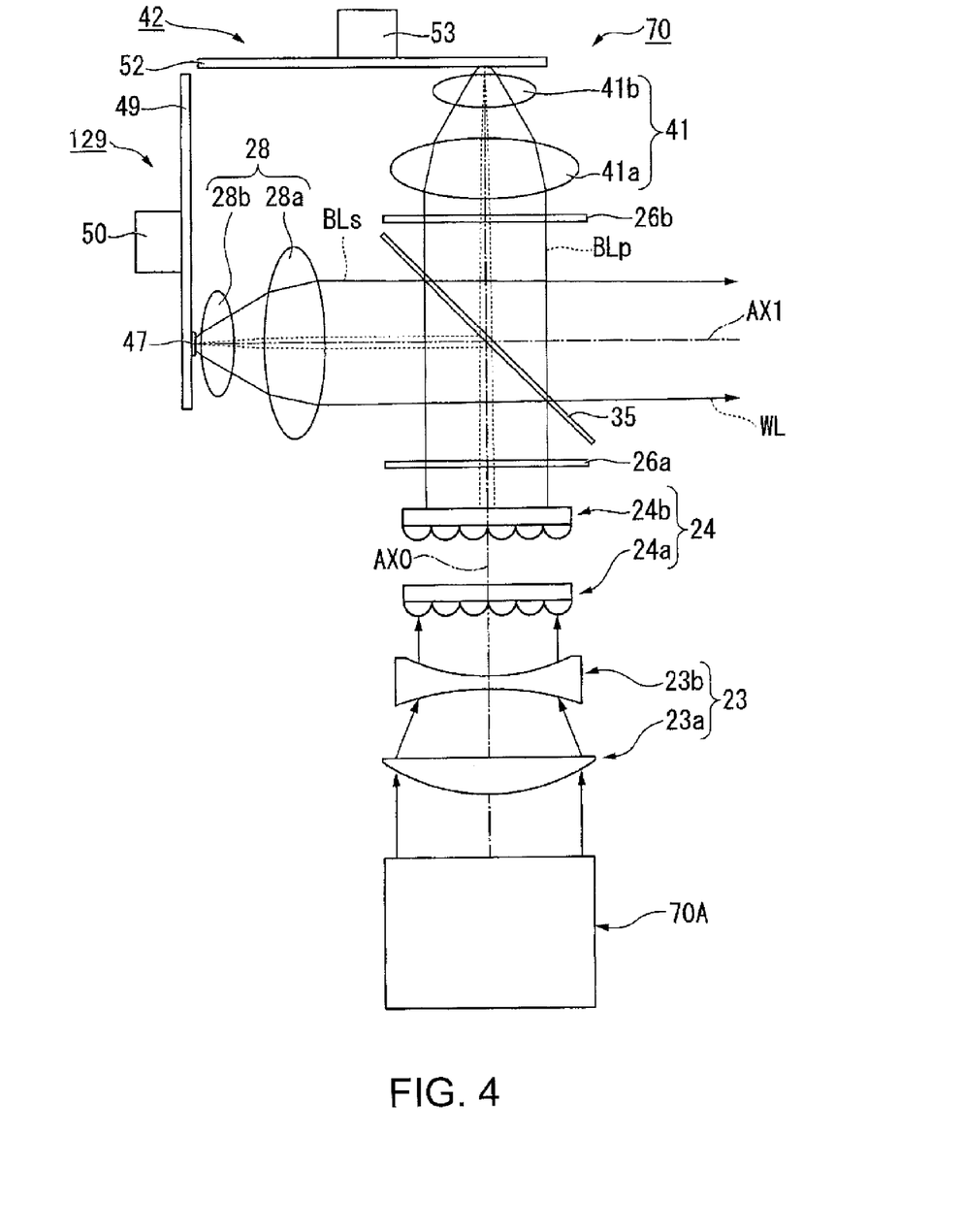
FIG. 4 is a diagram showing a schematic configuration of a light source device according to a second embodiment.

FIG. 4 is a diagram showing a schematic configuration of a light source device according to the present embodiment. It should be noted that configurations and members common to the embodiment described above and the present embodiment will be denoted by the same reference symbols, and the explanation thereof will be omitted, or simplified.

As shown in FIG. 4, the light source device 70 is provided with a light source unit 70A, the afocal optical system 23, the homogenizer optical system 24, a first wave plate 26a, a polarization beam splitter 35, a first pickup optical system 28, a phosphor wheel (a wavelength conversion element) 129 provided with a phosphor layer, a second wave plate 26b, a second pickup optical system 41, and a rotary diffusion element 42. The polarization beam splitter 35 corresponds to a "polarization splitting element" in the appended claims. Hereinafter, the polarization beam splitter 35 is abbreviated as PBS 35.

The light source unit 70A, the afocal optical system 23, the homogenizer optical system 24, the first wave plate 26a, the PBS 35, the second wave plate 26b, and the second pickup optical system 41 are disposed on an optical axis AX0. The first pickup lens 28 is disposed on an optical axis AX1 perpendicular to the optical axis AX0.

In the afocal optical system 23 of the present embodiment, by using the quartz lens as the afocal lens 23b and using the lens made of a general glass material as the afocal lens 23a, the disturbance of the polarization state caused in the light beams BL transmitted through the afocal optical system 23 is efficiently reduced while controlling the cost.

Figure 5:
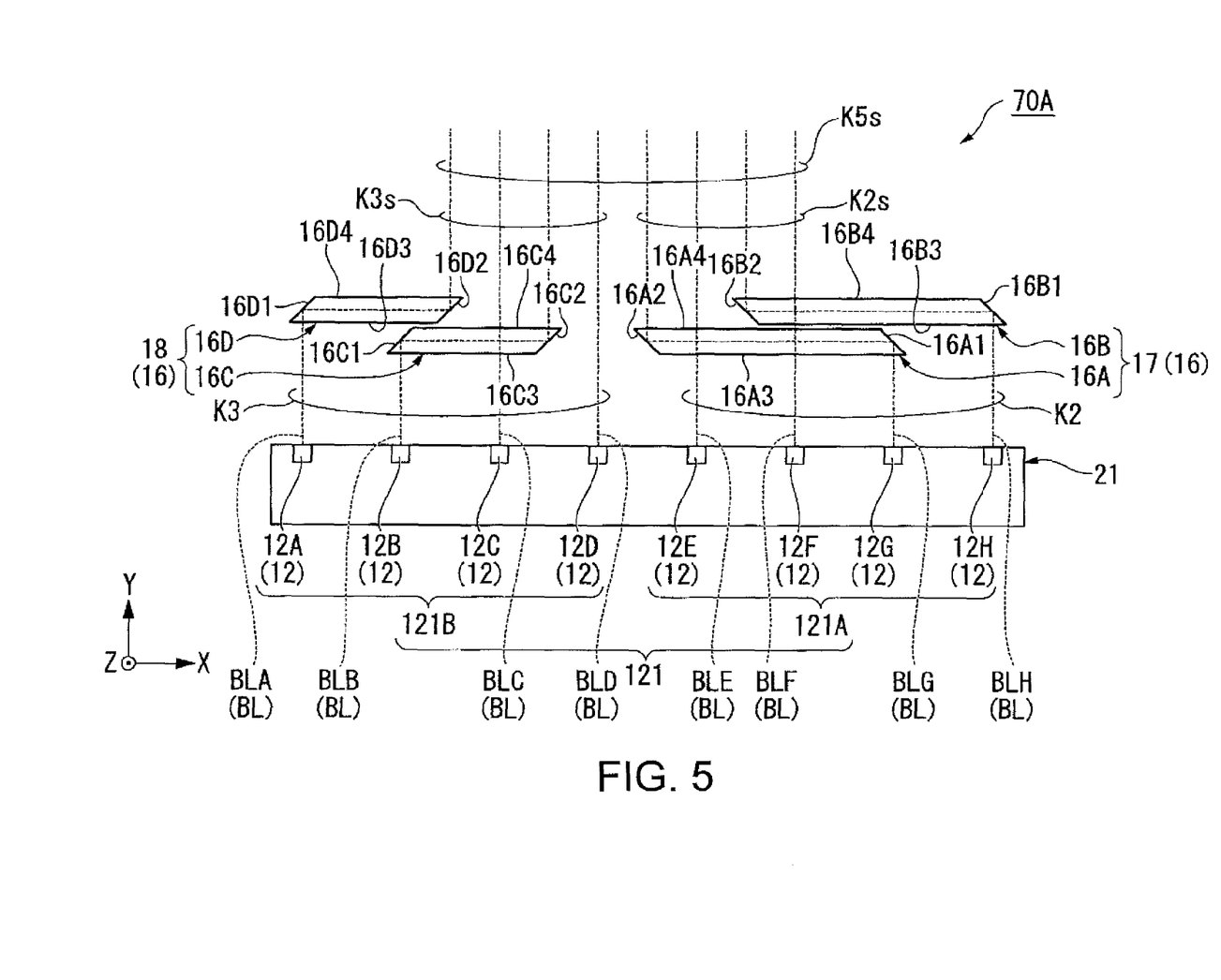
FIG. 5 is a diagram showing a schematic configuration of a light source unit.

FIG. 5 is a diagram showing a schematic configuration of the light source unit 70A.

As shown in FIG. 5, the light source unit 70A includes a light source section 121 and a reduction optical system 16. In the present embodiment, the light source section 121 includes a first light source section 121A and a second light source section 121B. The first light source section 121A and the second light source section 121B are formed integrally in the present embodiment, but can also be configured as separated bodies.

The first light source section 121A and the second light source section 121B each include a plurality of semiconductor lasers 12. The semiconductor lasers 12 each emit, for example, a blue light beam BL. The light beams BL emitted from the semiconductor lasers 12 are converted by a collimator lens (not shown) into parallel light beams.

The first light source section 121A and the second light source section 121B are each provided with the semiconductor lasers 12 arranged in a 4×4 matrix (see FIG. 6 described later). In other words, totally 32 semiconductor lasers 12 are arranged. It should be noted that in FIGS. 5 and 6, the row direction of the arrangement of the plurality of semiconductor lasers 12 is defined as a Z direction, the column direction is defined as an X direction, and a direction perpendicular to the Z direction and the X direction is defined as a Y direction. The number and the arrangement of the semiconductor lasers 12 are not particularly limited.

In the present embodiment, the first light source section 121A emits a bundle of light beams K2 formed of the plurality of light beams BL. Further, the second light source section 121B emits a bundle of light beams K3 formed of the plurality of light beams BL.

The reduction optical system 16 of the present embodiment includes a first reduction optical system 17 and a second reduction optical system 18. The reduction optical system 16 reduces the bundle of light beams K2 and the bundle of light beams K3, and then emits the result as a reduced bundle of light beams K5s.

The first reduction optical system 17 reduces the bundle of light beams K2, which proceeds toward the +Y direction, in the −X direction and then emits the result as a reduced bundle of light beams K2s. Further, the second reduction optical system 18 reduces the bundle of light beams K3, which proceeds toward the +Y direction, in the +X direction opposite to the first direction described above, and then emits the result as a reduced bundle of light beams K3s. The reduced bundle of light beams K2s and the reduced bundle of light beams K3s constitute the reduced bundle of light beams K5s.

The first reduction optical system 17 includes prisms 16A, 16B. The second reduction optical system 18 includes prisms 16C, 16D. These prisms 16A, 16B, 16C, and 16D are formed of synthetic quartz similarly to the afocal lens 23b.

In the present embodiment, the prisms 16A, 16B, 16C, and 16D correspond to an "optical element" in the appended claims.

It should be noted that the prisms 16A, 16B, 16C, and 16D are each formed of a plate-like member extending along the Z direction shown in FIG. 5, and each shift the light path of the light emitted from the semiconductor lasers 12 belonging to other laser columns in the X direction in a similar manner.

The prism 16A is provided with a first surface 16A3, a second surface 16A4, a first reflecting surface 16A1, and a second reflecting surface 16A2. The first reflecting surface 16A1 and the second reflecting surface 16A2 are each formed of a reflecting member for reflecting the light beams BL such as mirror. The first surface 16A3 and the second surface 16A4 each transmit the light beams BL.

The first reflecting surface 16A1 is tilted 45° from the normal direction (the Y direction) of the first surface 16A3. Therefore, it is possible for the first reflecting surface 16A1 to reflect the light beams BL, which have proceeded toward the Y direction, so as to bend 90° counterclockwise.

The second reflecting surface 16A2 is tilted 45° from the normal direction (the Y direction) of the second surface 16A4. Therefore, it is possible for the second reflecting surface 16A2 to reflect the light beams BL, which has been reflected by the first reflecting surface 16A1 and then proceeded inside the prism 16A, so as to bend 90° clockwise.

The prism 16B is provided with a first surface 16B3, a second surface 16B4, a first reflecting surface 16B1, and a second reflecting surface 16B2. The prism 16C is provided with a third surface 16C3, a fourth surface 16C4, a third reflecting surface 16C1, and a fourth reflecting surface 16C2. The prism 16D is provided with a third surface 16D3, a fourth surface 16D4, a third reflecting surface 16D1, and a fourth reflecting surface 16D2. Since the prisms 16B, 16C, and 16D are each configured similarly to the prism 16A, the detailed description will be omitted.

In the reduction optical system 16 of the present embodiment, the prisms 16A, 16B, 16C, and 16D are arranged based on a predetermined arrangement rule.

Specifically, the first reflecting surface 16B1 provided to the prism 16B is disposed on an opposite side (+X direction) to the reduction direction (−X direction) of the bundle of light beams K2 with respect to the first reflecting surface 16A1 provided to the prism 16A. Further, the second reflecting surface 16B2 provided to the prism 16B is disposed in the +X direction with respect to the second reflecting surface 16A2 provided to the prism 16A.

Further, the third reflecting surface 16D1 provided to the prism 16D is disposed in the −X direction with respect to the third reflecting surface 16C1 provided to the prism 16C, and the fourth reflecting surface 16D2 provided to the prism 16D is disposed in the −X direction with respect to the fourth reflecting surface 16C2 provided to the prism 16C.

Therefore, in the present embodiment, the plurality of reflecting surfaces provided to the reduction optical system 16 has a bilaterally symmetrical relationship in FIG. 5.

Hereinafter, the structure of the first reduction optical system 17 and the second reduction optical system 18 will be described.

The light beams BL emitted from the corresponding semiconductor lasers 12 out of the first light source section 121A respectively enter the prisms 16A, 16B constituting the first reduction optical system 17. Hereinafter, the semiconductor lasers 12 constituting the first light source section 121A are referred to as semiconductor lasers 12E, 12F, 12G, and 12H in sequence from the −X side toward the +X side in FIG. 5 for the sake of convenience of explanation.

As shown in FIG. 5, the light beam BLE emitted from the semiconductor laser 12E passes through the prism 16A. The light beam BL emitted from the semiconductor laser 12F passes through the prisms 16A, 16B.

The prism 16A is disposed so as to correspond to the semiconductor laser 12G, and the prism 16B is disposed so as to correspond to the semiconductor laser 12H.

The light beams BL emitted from the corresponding semiconductor lasers 12 out of the second light source section 121B respectively enter the prisms 16C, 16D constituting the second reduction optical system 18. Hereinafter, the semiconductor lasers 12 constituting the second light source section 121B are referred to as semiconductor lasers 12A, 12B, 12C, and 12D in sequence from the −X side toward the +X side in FIG. 5 for the sake of convenience of explanation.

As shown in FIG. 5, the light beam BLD having been emitted from the semiconductor laser 12D proceeds straight without entering any of the prisms. The light beam BLC emitted from the semiconductor laser 12C passes through the prism 16C.

The prism 16C is disposed so as to correspond to the semiconductor laser 12B, and the prism 16D is disposed so as to correspond to the semiconductor laser 12A.

In the present embodiment, the light beam BLG emitted from the semiconductor laser 12G enters the first reflecting surface 16A1 through the first surface 16A3 of the prism 16A, and is then reflected by the first reflecting surface 16A1 and the second reflecting surface 16A2 in this order, and is then emitted through the second surface 16A4. Thus, the light path of the light beam BLG is shifted toward the −X direction by the prism 16A.

Figure 6:
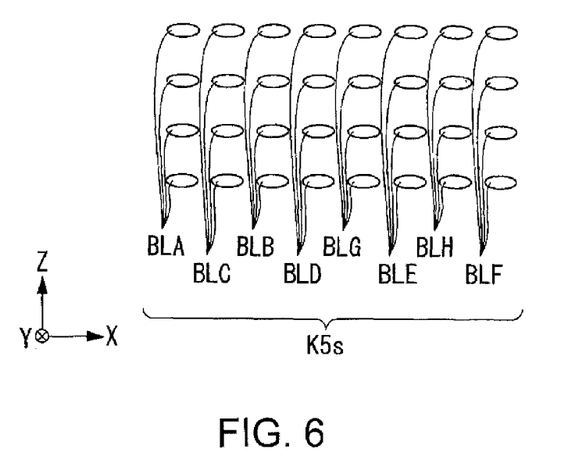
FIG. 6 is a diagram showing a reduced light beam reduced by a reduction optical system.

Here, FIG. 6 is a diagram showing the reduced bundle of light beams K5s reduced by the reduction optical system 16.

As shown in FIG. 6, the light beam BLG is located between the light beam BLE and the light beam BLD.

Further, as shown in FIG. 5, the light path of the light beam BLH emitted from the semiconductor laser 12H is shifted by the prism 16B toward the −X direction similarly to the light beam BLG. As shown in FIG. 6, the light beam BLH is located between the light beam BLE and the light beam BLF in the reduced bundle of light beams K5s.

In such a manner as described above, the first reduction optical system 17 converts the bundle of light beams K2 into the reduced bundle of light beams K2s. The proceeding direction of the reduced bundle of light beams K2s is roughly the same as the proceeding direction in which the bundle of light beams K2 enters the first reduction optical system 17.

The light beam BLB emitted from the semiconductor laser 12B enters the third reflecting surface 16C1 through the third surface 16C3 of the prism 16C, and is then reflected by the third reflecting surface 16C1 and the fourth reflecting surface 16C2 in this order, and is then emitted through the fourth surface 16C4. Thus, the light path of the light beam BLB is shifted toward the +X direction by the prism 16C. As shown in FIG. 6, the light beam BLB is located between the light beam BLD and the light beam BLC in the reduced bundle of light beams K5s.

As shown in FIG. 5, the light path of the light beam BLA emitted from the semiconductor laser 12A is shifted by the prism 16D toward the +X direction similarly to the light beam BLB. As shown in FIG. 6, the light beam BLA is located on the −X side, and in the vicinity of the light beam BLC in the reduced bundle of light beams K5s.

In such a manner as described above, the second reduction optical system 18 converts the bundle of light beams K3 into the reduced bundle of light beams K3s. The proceeding direction of the reduced bundle of light beams K3s is roughly the same as the proceeding direction in which the bundle of light beams K3 enters the second reduction optical system 18.

Therefore, the reduction optical system 16 of the present embodiment converts the bundle of light beams including the plurality of light beams BL emitted from the plurality of semiconductor lasers 12 into the reduced bundle of light beams K5s including the reduced bundle of light beams K2s and the reduced bundle of light beams K3s described above.

As described hereinabove, the light beam BLH and the light beam BLG proceed through the prism 16B and the prism 16A, respectively, in the −X direction over a long distance. Further, the light beam BLA and the light beam BLB proceed through the prism 16D and the prism 16C, respectively, in the +X direction over a long distance. Therefore, the reduction optical system 16 fulfills the first condition. However, since the prisms 16A, 16B, 16C, and 16D constituting the reduction optical system 16 are formed of quartz, the disturbance of the polarization state due to the reduction optical system 16 is reduced.

Therefore, in the case of using the light source device 70 according to the present embodiment for the projector, even if, for example, the output of the light beams BL from the light source section 121 (the semiconductor lasers 12) is increased in accordance with the projection mode of the projector, it is possible to reduce occurrence of the birefringence in the reduction optical system 16.

Therefore, according to the light source device 70 related to the present embodiment, since the reduction optical system 16 formed of quartz and the afocal optical system 23 including the quartz lens are provided, it is possible to make the light beams BL with the disturbance of the polarization state reduced enter the PBS 35. Thus, since it is possible to reflect the light beam BLc having predetermined light intensity toward the phosphor wheel 129, it is possible to keep the color balance (the white balance) of the illumination light WL roughly constant.

It should be noted that the invention is not limited to the contents of the embodiments described above, but can arbitrarily be modified within the scope or the spirit of the invention.

For example, in the embodiments described above, a part of the homogenizer optical system 24 can be formed of a quartz lens. Specifically, the multi-lens array 24b, which is disposed in the posterior stage of the multi-lens array 24a, and to which the light having been collected by the multi-lens array 24a is input, is preferably formed of the quartz lenses. This is because, the light high in light density is transmitted through the multi-lens array 24b, and therefore, the amount of heat generation of the multi-lens array 24b also increases. It should be noted that the multi-lens array 24a corresponds to a "first lens array" in the appended claims, and the multi-lens array 24b corresponds to a "second lens array" in the appended claims.

According to this configuration, since the disturbance of the polarization state of the light beams BL transmitted through the homogenizer optical system 24 can be reduced, the disturbance of the color balance of the illumination light WL can further be reduced.

Further, in the embodiments described above, each of the collimator lenses 22a of the collimator optical system 22 can also be formed of the quartz lens. According to this configuration, since the disturbance of the polarization state of the light beams BL transmitted through the collimator optical system 22 can be reduced, the disturbance of the color balance of the illumination light WL can further be reduced.

Further, in the embodiments described above, although the case of reducing the aberration by forming the light collection optical system of the afocal optical system 23 using a single aspherical lens (the afocal lens 23a) is cited as an example, it is also possible to reduce the aberration by forming the light collection optical system using two spherical lenses.

Figure 7:
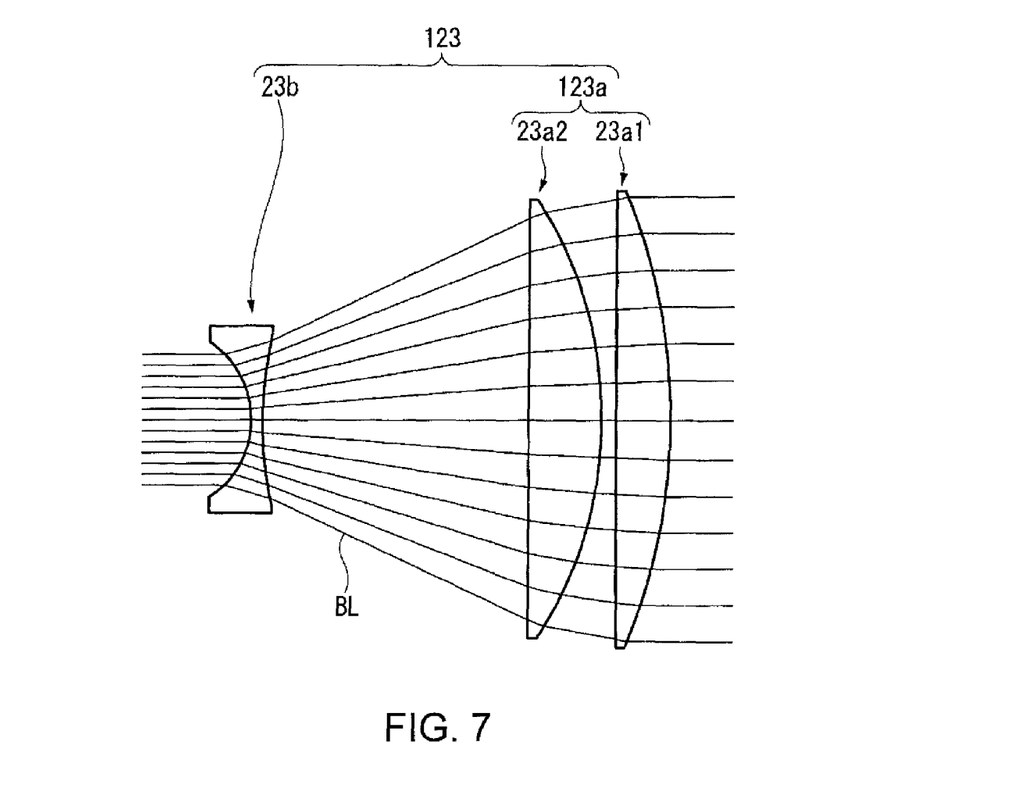
FIG. 7 is a diagram showing a configuration of an afocal optical system according to a modified example.

FIG. 7 is a diagram showing a configuration of an afocal optical system 123 according to a modified example. As shown in FIG. 7, the afocal optical system 123 according to the present modified example includes an afocal lens group 123a constituting the light collection optical system, and the afocal lens 23b constituting the collimating optical system.

The afocal lens group 123a includes afocal lenses 23a1, 23a2. The afocal lenses 23a1, 23a2 are each a spherical lens formed of quartz.

Here, an aspherical lens is extremely high in cost irrespective of the material of the glass material. Therefore, compared to the aspherical lens formed of a general glass material, the cost can dramatically be reduced with the spherical lens formed of quartz. Therefore, the difference in cost between the light collection optical system (the afocal lens group 123a) configured using two spherical lenses made of quartz and the light collection optical system (the afocal lens 23a) configured using a single aspherical lens made of a general glass material of the embodiment described above is small.

Since the afocal optical system 123 according to the present modified example is constituted only by the quartz lenses, the disturbance of the polarization state of the light beams BL having been transmitted through the afocal optical system 123 can further be reduced. Further, since the afocal lens group 123a constituting the light collection optical system is formed of the two spherical lenses made of quartz, it is possible to reduce the aberration caused in the light beams BL transmitted through the afocal optical system 123 while suppressing rise in cost.

Further, although in the embodiments described above, there is illustrated the projector 1 provided with the three light modulation devices 4R, 4G, and 4B, the invention can also be applied to a projector for displaying a color picture using a single light modulation device. Further, a digital mirror device can also be used as the light modulation device.

Further, although in the embodiments described above, there is described the example of mounting the light source device according to the invention in the projector, the invention is not limited to the example. The light source device according to the invention can also be applied to lighting equipment, a headlight of a vehicle, and so on.

The entire disclosure of Japanese Patent Application No. 2015-243273, filed on Dec. 14, 2015 is expressly incorporated by reference herein.

What is claimed is:
1. A light source device comprising:
a solid-state light source;
a collimator lens which a light beam emitted from the solid-state light source enters;
an afocal optical system which includes a light collection optical system and a collimating optical system and which the light beam having been transmitted through the collimator lens enters;
a lens integrator which the light beam having been transmitted through the afocal optical system enters;
a polarization splitting element which the light beam having been transmitted through the lens integrator enters; and
a wavelength conversion element which a first polarization component split by the polarization splitting element from the light beam enters, wherein:
at least one of the light collection optical system and the collimating optical system includes a lens formed of quartz, the light collection optical system is constituted by an aspherical lens formed of a glass material higher in thermal expansion coefficient than the quartz, and the collimating optical system is constituted by a biconcave lens formed of the quartz.

2. The light source device according to claim 1, wherein the lens integrator includes a first lens array, and a second lens array disposed in a posterior stage of the first lens array and formed of the quartz.

3. The light source device according to claim 1, wherein the collimator lens is formed of the quartz.

4. The light source device according to claim 1, further comprising:

a reduction optical system adapted to reduce a cross section of a bundle of light beams formed of a plurality of the light beams having been emitted from a plurality of the solid-state light source, and having been transmitted through a plurality of the collimator lenses, wherein the reduction optical system includes an optical element formed of the quartz.

5. The light source device according to claim 1, wherein the quartz is synthetic quartz.

6. A projector comprising:

the light source device according to claim 1;

a light modulation device adapted to modulate light from the light source device in accordance with image information to thereby form image light; and a projection optical system adapted to project the image light.

7. A projector comprising:

the light source device according to claim 2;

a light modulation device adapted to modulate light from the light source device in accordance with image information to thereby form image light; and a projection optical system adapted to project the image light.

8. A projector comprising:

the light source device according to claim 3;

a light modulation device adapted to modulate light from the light source device in accordance with image information to thereby form image light; and a projection optical system adapted to project the image light.

9. A projector comprising:

the light source device according to claim 4;

a light modulation device adapted to modulate light from the light source device in accordance with image information to thereby form image light; and a projection optical system adapted to project the image light.

10. A projector comprising:

the light source device according to claim 5;

a light modulation device adapted to modulate light from the light source device in accordance with image information to thereby form image light; and a projection optical system adapted to project the image light.

11. A light source device comprising:

a solid-state light source;

a collimator lens which a light beam emitted from the solid-state light source enters;

an afocal optical system which includes a light collection optical system and a collimating optical system and which the light beam having been transmitted through the collimator lens enters;

a lens integrator which the light beam having been transmitted through the afocal optical system enters;

a polarization splitting element which the light beam having been transmitted through the lens integrator enters; and a wavelength conversion element which a first polarization component split by the polarization splitting element from the light beam enters, wherein:

at least one of the light collection optical system and the collimating optical system includes a lens formed of quartz, the light collection optical system is constituted by two spherical lenses formed of the quartz, and the collimating optical system is constituted by a biconcave lens formed of the quartz.

12. A projector comprising:

the light source device according to claim 11;

a light modulation device adapted to modulate light from the light source device in accordance with image information to thereby form image light; and a projection optical system adapted to project the image light.

* * * * *